June 9, 1953 J. Y. ESTABROOK 2,641,104
TAIL CONE HAVING RADIALLY ADJUSTABLE WALL
Filed April 18, 1950 2 Sheets-Sheet 1
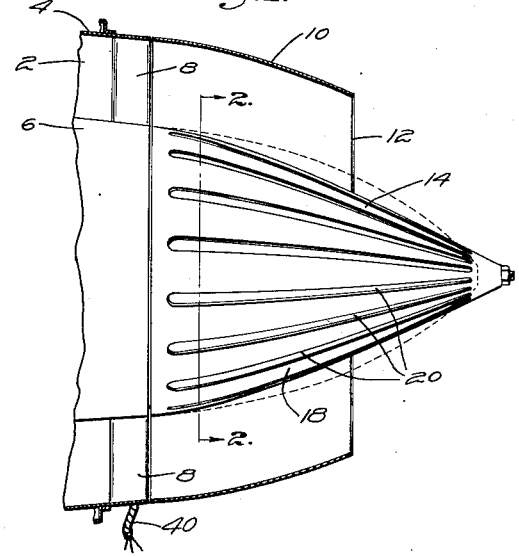
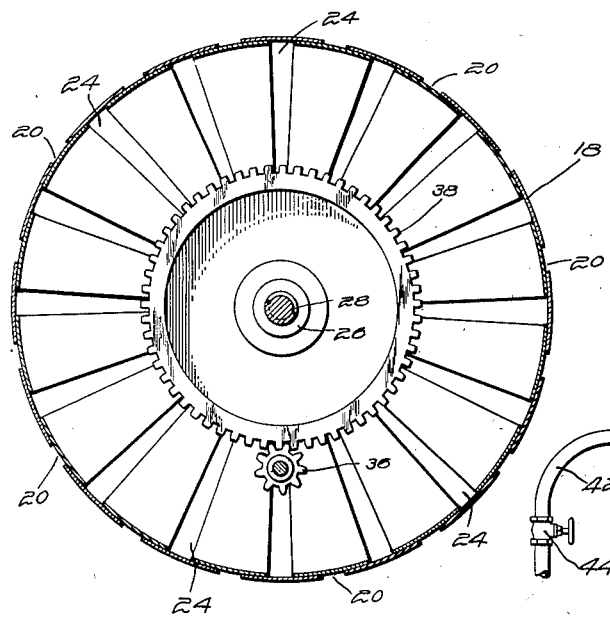
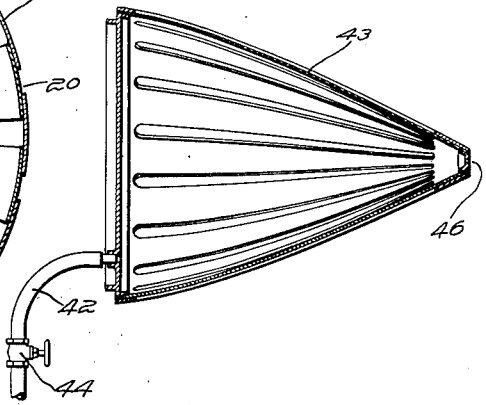
Inventor
John Y. Estabrook
by Charles A. Warner
Attorney

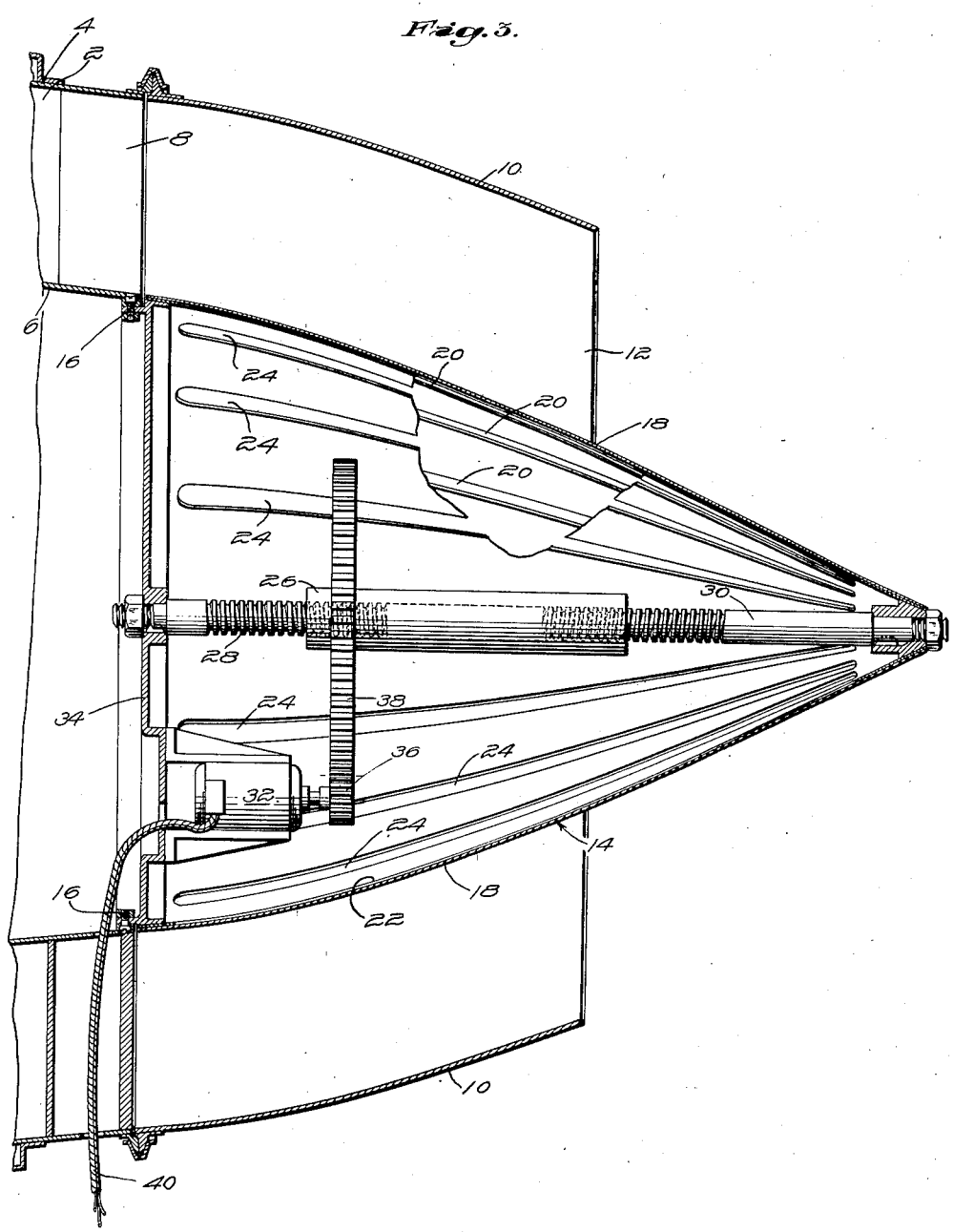

Patented June 9, 1953

2,641,104

UNITED STATES PATENT OFFICE 2,641,104

TAIL CONE HAVING RADIALLY ADJUSTABLE WALL

John Y. Estabrook, Oak Ridge, Tenn., assignor to United Aircraft Corporation, East Hartford, Conn., a corporation of Delaware Application April 18, 1950, Serial No. 156,682

3 Claims. (Cl. 60—35.5)

This invention relates to variable area thrust nozzles for jet engines.

A thrust nozzle generally has an annular discharge passage defined by a tail cone located centrally within the surrounding nozzle duct. In many cases the tail cone has been axially adjustable for the purpose of varying the area of the discharge passage where such variation has been advantageous in connection with the operation of the power plant with which the thrust nozzle is associated. The axial adjustment of nozzle within the stream of hot gas has necessitated the careful fitting of parts in order that the axial adjustment will not be interfered with after operation of the power plant over a considerable period. Moreover, the change of the axial position of the tail cone has frequently interfered seriously with the flow of air through the thrust nozzle by changing the contour of the walls defining the passage. A feature of this invention is a tail cone which is radially expansible for controlling the discharge passage area surrounding the cone. Another feature is an arrangement for adjusting the nozzle area by moving one of the walls radially.

Another feature of the invention is an arrangement for causing expansion or contraction of the tail cone by the application of an axially directed force on the tail cone since such a force is readily applied mechanically to the tail cone. Another feature is the adjustment of the tail cone in response to variation in the pressure within the tail cone.

Other objects and advantages will be apparent from the specification and claims, and from the accompanying drawings which illustrate an embodiment of the invention.

Fig. 1 is a longitudinal sectional view through a thrust nozzle showing the adjustable cone therein.

Fig. 2 is a transverse sectional view through the cone, the section being taken on line 2—2 of Fig. 1.

Fig. 3 is a longitudinal section on a larger scale showing an arrangement for adjusting the cone radially.

Fig. 4 is a view similar to Fig. 3 showing a modification.

The invention is shown in connection with a thrust nozzle of a gas turbine power plant with the gases exhausting from the turbine discharging through an annular passage 2 defined by the surrounding wall 4 and an inner wall 6, the walls being held apart, for example, by radially extending vanes 8. The thrust nozzle 10 is attached to the downstream end of the wall 4 and is preferably of gradually decreasing cross sectional area to its discharge end 12.

The variable tail cone 14 is positioned within the thrust nozzle 10 with its downstream end preferably extending beyond the end of the nozzle 12. At its upstream end the periphery of the tail cone is in alignment with the inner wall 6 and may be attached directly thereto as by bolts 16, Fig. 3. The tail cone is made up of an outer conical member 18 which has a number of axially extending slots 20 extending substantially the entire length of the conical member and thereby permitting radial expansion of the member between its ends, and a second mating conical member 22 positioned directly within and in contact with the member 18 and also provided with axially extending slots 24 which, as best shown in Fig. 2, are angularly spaced from the slots 20 thereby to prevent leakage of the gas into or out of the tail cone. The material of the members 18 and 22 is sufficiently resilient to permit the two members to lie in direct contact with each other and the relative spacing of the slots is such that when the tail cone is radially expanded to its limit, the slots 20 and 24 will not overlap.

Any suitable device may be provided for expanding the tail cone, the device in Fig. 3 being a turn buckle 26 engaging with right- and left-hand threaded rods 28 and 30 projecting respectively from the base of the tail cone and the tip. By rotation of the turn buckle 26 the base and tip of the cone may be moved toward or away from each other thereby causing expansion or contraction of the tail cone in a radial direction. The turn buckle may be turned mechanically as by a motor 32 which may be mounted on the base member 34 of the cone and which drives the turn buckle through cooperating gears 36 and 38. The control of the motor would be through leads 40 which might be brought out through one of the radial struts 8.

Instead of mechanical expansion and contraction of the tail cone the expansion may take place by the application of fluid pressure internally of the tail cone. With this arrangement as shown in Fig. 4, a conduit 42, which might be brought through one of the struts 8, communicates with the tail cone 43 preferably through the base. By use of a valve 44 the rate of flow of air or the pressure of air delivered to the tail cone may be varied to obtain the desired expansion or contraction of the tail cone within the nozzle. The valve 44 may selectively connect the conduit 42 to a source of pressure or to a vent, or, instead, the tip of the tail cone may be provided with a small orifice 46 which allows a continuous limited flow of fluid out of the tail cone so that the expansion or contraction of the cone would be determined directly by the setting of the valve 44.

It is to be understood that the invention is not limited to the specific embodiment herein illustrated and described, but may be used in other ways without departure from its spirit as defined by the following claims.

I claim:

1. A variable area thrust nozzle including a substantially closed conical member having a base, a wall and a tip and adapted to be centrally mounted within the nozzle, and means for expanding the wall of said member radially including means for moving the tip of the member in an axial direction with respect to the base thereby causing radial expansion or contraction of the wall.

2. A variable area thrust nozzle including a substantially closed conical member having a base, a wall and a tip and adapted to be centrally mounted within the nozzle, and means for expanding the wall of said member radially including means acting internally of the member to cause radial expansion of said wall between the base and the apex of the member.

3. A variable area thrust nozzle including a substantially conical device adapted to be located within the nozzle, said device including a base, a tip, and inner and outer wall closely fitting each other, each wall having a number of axially extending slots to permit expansion of said walls radially, the slots having closed ends and extending substantially the entire length of each wall, the slots of one wall being staggered with respect to the other to prevent leakage through the walls, and means for moving the tip in an axial direction with respect to the base to cause radial movement of the mid-portion of the device.

JOHN Y. ESTABROOK.

References Cited in the file of this patent

UNITED STATES PATENTS

| Number | Name | Date |
| --- | --- | --- |
| 157,526 | Leggett | Dec. 8, 1874 |
| 186,310 | Curtis | Jan. 16, 1877 |
| 1,120,535 | Pruden | Dec. 8, 1914 |
| 2,462,953 | Eaton et al. | Mar. 1, 1949 |
| 2,481,330 | Neal | Sept. 6, 1949 |
| 2,563,270 | Price | Aug. 7, 1951 |